(12) United States Patent
Hiller et al.

(10) Patent No.: US 6,658,659 B2
(45) Date of Patent: *Dec. 2, 2003

(54) COMPATIBLE VERSION MODULE LOADING

(75) Inventors: Dean Hiller, Shrub Oak, NY (US); Thomas Gee, Clifton, VA (US); David F. Doner, Jr., Mahopac, NY (US)

(73) Assignee: Cisco Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/464,881

(22) Filed: Dec. 16, 1999

(65) Prior Publication Data

US 2003/0159135 A1 Aug. 21, 2003

(51) Int. Cl.[7] ............................................. G06F 9/44
(52) U.S. Cl. ................ 717/170; 717/168; 717/166; 717/169; 717/174; 717/177; 707/203
(58) Field of Search ................. 717/170, 168, 717/169, 174, 177, 166; 707/203; 171/170

(56) References Cited

U.S. PATENT DOCUMENTS

| | | | | |
|---|---|---|---|---|
| 5,317,722 A | * | 5/1994 | Evans ........................ | 717/170 |
| 5,499,365 A | * | 3/1996 | Anderson et al. ........... | 700/182 |
| 5,577,232 A | * | 11/1996 | Priem et al. ................ | 717/170 |
| 5,579,509 A | * | 11/1996 | Furtney et al. .............. | 703/27 |
| 5,634,114 A | * | 5/1997 | Shipley ...................... | 717/170 |
| 5,805,899 A | * | 9/1998 | Evans et al. ................ | 717/170 |
| 5,974,470 A | * | 10/1999 | Hammond ................... | 707/203 |
| 5,987,471 A | | 11/1999 | Bodine et al. .............. | 707/103 |
| 5,995,100 A | | 11/1999 | Auslander .................. | 345/335 |
| 6,185,734 B1 | * | 2/2001 | Saboff et al. ............... | 707/203 |
| 6,415,435 B1 | * | 7/2002 | McIntyre .................... | 717/108 |
| 6,442,753 B1 | * | 8/2002 | Gerard et al. ............... | 717/170 |

OTHER PUBLICATIONS

Beech, David and Mahbod, Brom, "Generalized Version Control in an Object-Oriented Database", Database Technology Department, Hewlett-Packard Laboratories, Palo Alto, CA 1988 IEEE, retrieved from IEEE database Aug. 21, 2002.*

Chou, Hong-Tai and Kim, Won, "Versions and Change Notification in an Object-Oriented Database System", 25th ACM/IEEE Design Automation Conference, 1988, retrieved from IEEE database Aug. 21, 2002.*

Williams, Tom, "Software tools move toward automating process management", Electronic Design, Feb. 17, 1997, retrieved from ProQuest database, Aug. 20, 2002.*

* cited by examiner

Primary Examiner—Tuan Q. Dam
Assistant Examiner—Mary Steelman
(74) Attorney, Agent, or Firm—Beyer, Weaver & Thomas, LLP.

(57) ABSTRACT

A system and method for loading software identifies versions of software modules to be loaded. The version identification allows a loader to request, access and load any level or version of a program that the application interacts with. Thus, the loader selects only specific versions of software that are known to be compatible with other software currently loaded or being loaded. The software includes specific compatibility information that is used to determine whether it should be selected or passed over for another version of the same software. In this manner, a "version aware" loader ensures that loaded software modules are compatible with one another and will therefore execute properly. The version aware loader may be implemented in an operating system or other loading software running on a personal computer or network router.

40 Claims, 6 Drawing Sheets

COMPATIBLE VERSION MODULE LOADING

FIELD OF THE INVENTION

The present invention relates to systems and methods for loading software. More specifically, the invention relates to systems and methods that are used by a program loader to manage the compatibility of software programs by detecting and processing version information.

BACKGROUND OF THE INVENTION

In a computer system, software programs are frequently loaded into memory for subsequent execution. The loading process is typically performed by a program loader and may be initiated from different locations in the system including internal API calls or from applications or command line programs. Typically, a given program specifies the name of the program to be loaded. From this point, the loading process can be divided into two parts. The first is locating the program file to be loaded and the second is loading the program. To locate the program file, the loader searches through the file system according to a search path.

The search path is a consistent searching mechanism for finding one or more program files to be loaded. The search path may be defined according to the names of the directories to be searched when the loader retrieves a program. For efficiency, the search path may limit the amount of searching to a subset of the entire file system. In one conventional approach, the loader limits the search path to one or more eligibility lists. The eligibility lists are typically defined in terms of the file names and the order in which the entries within the directories are listed.

FIG. 1 illustrates a search path 100 suitable for illustrating a common searching methodology of conventional loading mechanisms. The path 100 includes libraries 102, 104 and 106. The libraries 102, 104 and 106 may represent separate directories, partitioned data sets or disk drives, for example. The libraries 102, 104 and 106 each contain a different version of program P and program Q. More specifically, the libraries 102, 104 and 106 contain versions P 1.3 108, P 1.2 112 and P 1.1 116 respectively. Similarly, the libraries 102, 104 and 106 contain versions Q 2.1 110, Q 2.2 114 and Q 2.3 118 respectively.

The loader would typically search down the search path 100 in the order in which the directories and entries were listed. The loader would select the first program of the correct name that it found. When two programs of the same name exist in the search path, the loader would select the first program of the correct name that it encountered. For example, in a search for program P where the loader searches from left to right through the search path 100, the loader would always select P 1.3 (108) for loading. Thus, in this example, the most recent version of the program would be loaded. Similarly, when looking to load program Q, the loader would always load Q 2.1 (110), which corresponds to the oldest version of the program. In this case, copies of the programs P and Q residing in the center 104 and rightmost libraries 106, or any other libraries located subsequent to 108 and 110 in the search path 100, would be ignored by the loader.

Many operating systems are developed and designed independently of the software applications running on them. In addition, a given software application is typically developed independently from other software applications running on the operating system, including those which it interacts with. Further, many operating systems and applications contain numerous subparts, which may be characterized as separate modules or programs. Together the modules or programs comprise the operating system or application. In the case of very large operating systems or applications, these modules should be developed somewhat independently of one another, by different groups of software engineers and programmers, for example. Software operating systems or applications are continually updated and released as new specific versions. As new versions of software operating systems and applications are released, they are loaded onto computer systems and are expected to be compatible with other software installed on the computer. In many cases, the new software requires particular versions of other programs that it interacts with. The loading and searching strategy of FIG. 1 is often inadequate since it always loads the first program according to name, regardless of compatibility with newly released software.

Modem computer systems typically run many different software applications. Accordingly, it is common for different versions of a program to be required by multiple software applications (e.g., clients) developed at varying dates. In an environment where different versions of a program are required, the above loading and searching strategy is also inadequate. This is because it will always locate the first program in the search path having desired name, regardless of version requirements for the different software applications.

Other searching methodologies may vary the searching order. This may be done by overriding the system wide eligibility lists. By way of example, the user may change the left to right order of the libraries 102, 104 and 106. Alternatively, the user may specify one or more substitute libraries to be used in place of the system wide eligibility lists. Despite these changes in the order in which the programs are encountered by the loader during searching, the changes do not address the inability to load anything but the first named program in the list encountered, regardless of version appropriateness to the software application being loaded. In addition, changing the system wide eligibility lists is not always possible or desirable to other functions requiring use of the eligibility lists. Further, the resulting override is often cumbersome, error prone and thus undesirable for support personnel.

Current searching methodology may include refining the eligibility lists in which the search progresses. More specifically, a search may be refined by a searching criteria. For example, in conventional UNIX loading, the eligibility lists are determined by one or more environment variables, i.e. PATH and LD_LIBRARY_PATH. While increasing searching efficiency, this searching methodology is still inadequate since it will retrieve the first version of the program encountered, regardless of version adequacy. In other words, alternate, and potentially better suited, versions of the program down the search path 100 are not selected.

The loading process may be invoked at run time or at any time prior to execution. In one conventional approach, an application is loaded at run time together with code that is shared between multiple applications. For example, a dynamic linked library (DLL) may be used. The DLL provides code for common resources and functions to be shared between multiple applications. The shared code may be responsible for common actions such as open, disconnect, etc. During loading, memory addresses for DLLs are established. Typically, accessing the shared code of the DLL requires an application to provide an established set of arguments. Once the proper arguments are entered, an address for the functions that the shared code is to perform is returned to the application.

Often there is no mechanism to check whether the proper arguments are being sent to the DLL. A new version of an application may supply different arguments than a previous version (e.g., a new version supplies two arguments for a particular function, while the previous version supplied four arguments in a particular order). As a result, the DLL may not be able to handle the new version; e.g., it may treat improper arguments as proper arguments. Regardless, the application will not receive the desired result from the DLL. In addition, because the problem is encountered at run time, the error is usually not detected until the application is executed, after considerable resources have already been expended.

Some large and complex software products such as network router operating systems have minor bugs that only show up in very limited environments. It has become increasingly common for specific customers to identify such bugs. The software vendor may issue bug fix in the form of a monolithic copy of the entire large software product. All users receiving this new version of the product must replace their previously installed product in its entirety. While the bug fix may solve the problem of some users, it may create problems for other users. This is leading some organizations to develop modular operating systems, which have various versions of individual modules comprising the overall operating system. In this manner, one module version designed to fix a bug observed in the context of one customer's application, need not be distributed to other users, whose applications do not generate a problem with the existing software.

In view of the foregoing, it is clear that two additional capabilities, if added to the capabilities of most operating systems, would prove highly beneficial. The first is a technique for locating, not just a named program as is now done, but a particular version of a given program. The second is a technique for defining compatibility between different versioned applications.

SUMMARY OF THE INVENTION

The present invention provides systems and methods for enhanced software loading. When loading an application, version identification is included as part of the request. This allows a loader to request, access and load any level or version of a program or module required for execution regardless of its location in the search path. Once selected by the loader, a module or program may include specific compatibility information, which may be used to further determine whether it should be selected or passed over for another version of the same software. Using such information, a "version aware" loader provides one way to ensure that loaded software modules are compatible with one another. This has a further benefit of allowing multiple versions of a software module to be accessed, loaded and stored conveniently within a given search path; a capability which greatly reduces operating system complexity. The version aware loader and loading techniques of the present invention may be conveniently implemented in an operating system or other loading software running on a wide variety of platforms, such as a personal computer or network router.

One aspect of the invention pertains to a method of loading into memory a software program having multiple modules, at least one of which is available in a plurality of versions identified by a set of version numbers. The method may be characterized by the following sequence: (a) identifying a module to be loaded as part of the software program, wherein the module is identified, at least in part, by an acceptable version number; (b) selecting the module based upon an acceptable version number from among the set of versions numbers of the module; and (c) loading the selected module into memory. Typically, the method will involve executing the selected module soon after it has been loaded into memory. If no module was found that corresponded to an acceptable version number, the method may inform the user of this failure.

Typically, the plurality set of versions of the module share a common name, each of which has a unique version number. Often, modules that potentially satisfy the load criteria will first be located by using the common name to search for the module in the specified search path. Each potential candidate will then subjected to version checking to ensure its acceptability. The selected module will be the first module found in the path that has the common name and the acceptable version number. Thus, it may be necessary to examine several potential candidate-modules in order to find one that has an acceptable version number.

In some embodiments, the acceptable version number set is identified by a Boolean expression. In one example, such Boolean expression may specify a group of version numbers that are greater than or equal to a particular version number of the module. To account for the possibility that an open ended Boolean expression may specify a range of versions that include members that are not backward compatible, the method may require confirming that the selected module is compatible with any modules that call it.

Another aspect of the invention pertains to computer program products including a machine readable medium which provides program instructions for implementing a method as described above. Any of the methods of this invention may be represented as program instructions that can be provided on such computer readable media.

Yet another aspect of the invention pertains to a versioned software module capable of being loaded with various combinations of other modules. The software module may be characterized by the following features: (a) a name in common with at least one module not included in the software program; and (b) a compatibility vector. The module and the at least one module not included in the software program differ from one another by a version identification included in the module (e.g., in a header of the module). The compatibility vector includes a set of entries. Each entry in the set includes (i) the name of a component containing a called module that is called by the versioned software module during execution, and (ii) a compatible version number or group of version numbers for the component containing the called module. The compatible version number or the group of version numbers may be expressed as a logical range of version numbers (e.g., as a Boolean expression). The versioned software module may also include indicia of backward incompatibility with other modules that may call the versioned software module.

Yet another aspect of the invention pertains to a computer system capable of loading and executing software. The computer system may be characterized by the following features: (a) a memory which temporarily stores software modules for execution; (b) a processor which executes loaded software modules; and (c) a loader which loads said software modules into the memory. The loader selects at least some software modules for loading based on acceptable version numbers when such modules are available in a plurality of versions identified by a set of version numbers.

Typically, though not necessarily, the computer system will include a second memory, which persistently stores the software modules. The loader loads the software modules into memory from the second memory prior to execution. In many ways, the loader acts in accordance with the method described above. For example, the loader may consider a compatibility vector of a software module when selecting modules for loading.

The invention relates in accordance with another embodiment to an operating system capable of running with multiple versions of a module. The operating system includes a first numbered version of the module. The operating system also includes the second through the nth numbered versions of the module, wherein the first numbered version of the module and and any number of the second through the nth versions of the module are loaded independently and are used or are available for use by the system in a concurrent fashion.

The invention relates in accordance with a further embodiment to a method managing a software environment, the software environment including a plurality of software programs, the plurality of software programs including a set of modules that share a common name, but which differ by version as defined in their different version numbers. The method includes loading a first numbered version of the module having a common name for a first program. The method also includes loading a second through the nth numbered version of the module having a common name for a second through nth programs. The method further includes running the first numbered version of the module having a common name. The method additionally includes running the second numbered version of the module having a common name.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following detailed description of the present invention, numerous specific embodiments are set forth in order to provide a thorough understanding of the invention. However, as will be apparent to those skilled in the art, the present invention may be practiced without these specific details or by using alternate elements or processes. In other instances well known processes, procedures, components, and circuits have not been described in detail so as not to unnecessarily obscure aspects of the present invention.

The present invention provides systems and methods for loading only compatible software modules prior to execution. Loading is a process by which software is made available for execution by a computer system's processing resources (e.g., one or more processors). Typically, loading involves assigning an address for accessing the software or parts thereof during execution. The software may be loaded into main memory to allow rapid access during execution.

Different versions of a single named software program or module have at least slightly different code. For the purpose of describing this invention, different versions of a given module are said to be different if either their content is different or their semantics are different. In general, these different versions perform the same function during execution, but may do so in slightly different ways, use different arguments, and or produce different results. For example, a newer version may require slightly different arguments or argument formats. Further, different versions may have slightly different API function calls, performing additional supplemental functions not provided in an earlier version. Those of skill in the art will recognize that a range of differences may be attributable to different versions of a given software module.

Figure 2A:
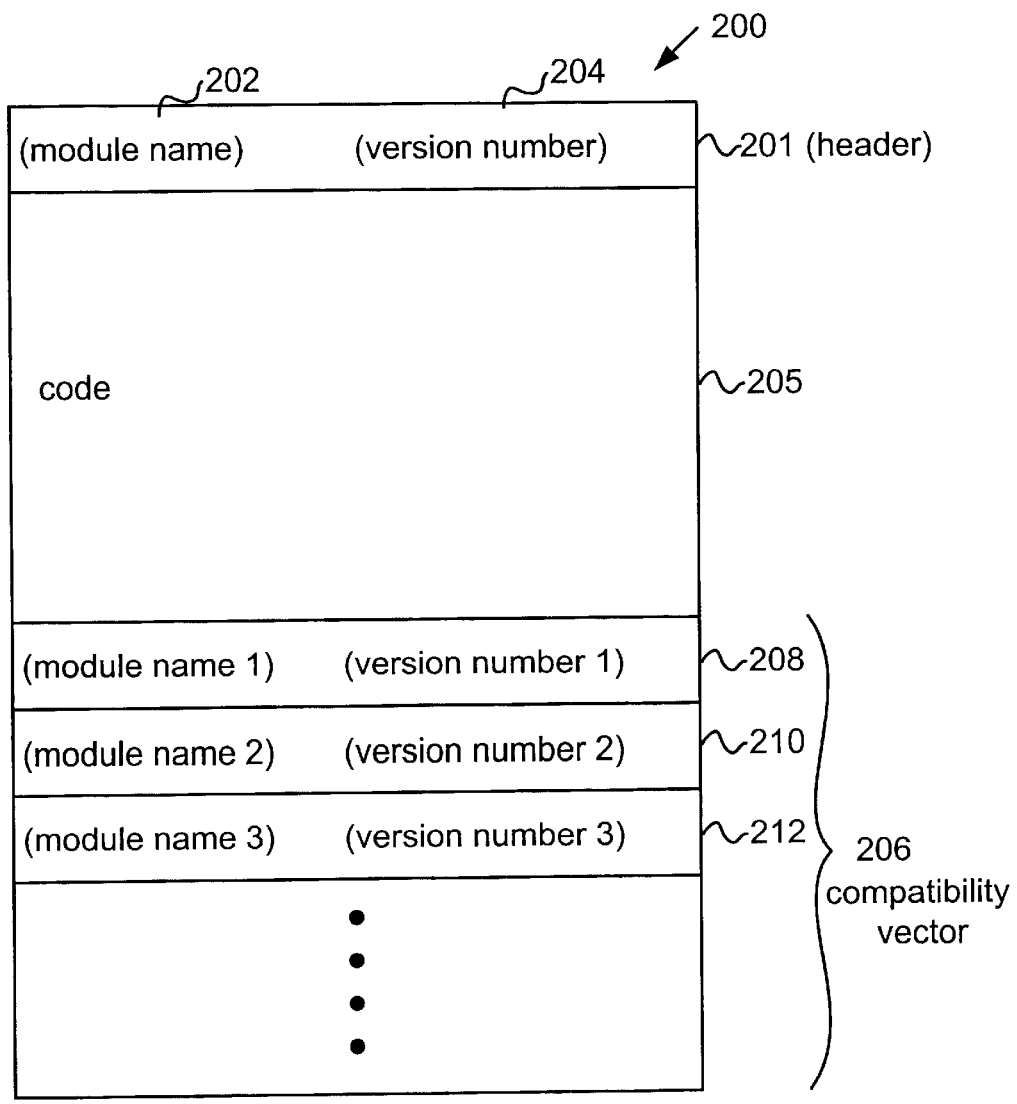
FIG. 2A illustrates a module to be loaded in accordance with one embodiment of the present invention.

Version identification in accordance with this invention allows a loader to request, access and load any level or version of a program that the application interacts with. FIG. 2A illustrates a software module 200 suitable for loading in accordance with one embodiment of the present invention. The module 200 may be included in a program or any other software application to be run. For example, the module 200 may be a file that contains executable code included in a code portion 205. The module may also be included in a component. Generally speaking, a component is a collection of one or more modules. By way of example, an "access method" component may include two modules "init" and "access". The "init" module may contain code for open and close functions while the access module may contain code for the read and write functions.

The module 200 includes a header 201. The header 201 contains information pertaining to the operation and implementation of the module 200. For example, the header 201 includes a module name 202. The module name 202 may be shared with other modules, i.e., in a search path or in memory. To differentiate similarly named modules, the header 201 includes a version identifier 204 such as a version number. The version identifier 204 may allow module differentiation based on release or version differences. In one embodiment to differentiate between versions, the version identifier 204 includes a major number and a minor number on the left and right sides of a decimal point. For example, the number 1.1 may identify one version of a packet manager module and the number 1.2 may identify a different version of the same packet manager module. In addition to the version identifier 204, the header 201 may also contain other implementation information such as an application program interface (API) number for the module 200.

The loading of module 200 is intended to be performed by a version aware loader that can make use of the module name and version number specified in the header. The version aware loader may be any loader having the ability to differentiate between versions of a module. Upon loading, the version aware loader is responsible for taking the module 200 from disk and loading it into memory, or otherwise making it available, for subsequent execution. In order to do this, the loader must point any internal calls to the proper addresses such that they are available to the module 200 upon execution.

In one embodiment, both the module name 202 and the version identifier 204 is also provided in a directory or path that is considered by the loader during loading. Then upon loading (or prior to loading) of the module 200, the adequacy of the version identifier may be confirmed. In this manner, the appropriate version of the module 200 may be loaded for an application. In addition, multiple versions of the module 200 may be loaded and maintained within a software environment simultaneously. From these multiple versions, any one version may be selected and executed at any time.

Figure 1:
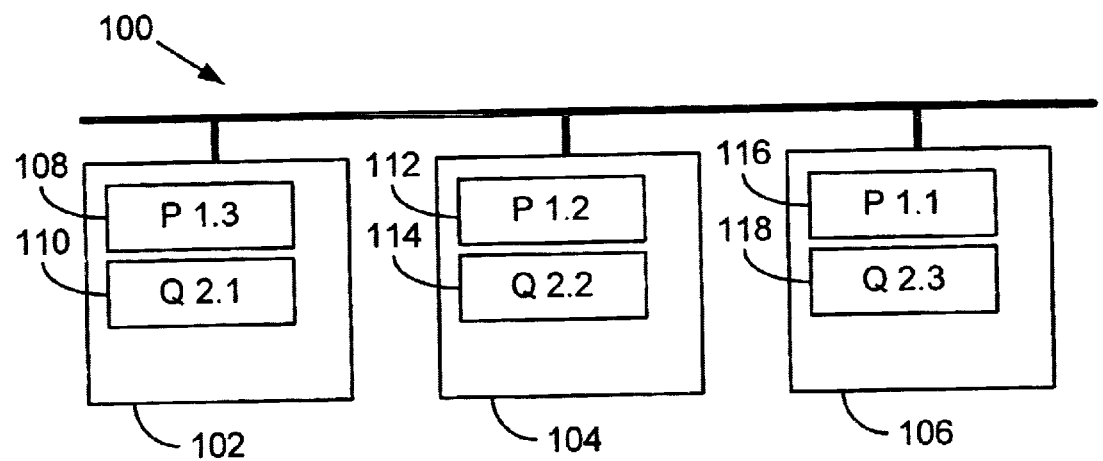
FIG. 1 illustrates a search path suitable for illustrating a common searching methodology of conventional loading mechanisms.

Thus, the version aware loader and version aware loading techniques of the present invention allow a user to specify an acceptable version of the module name 202 to be loaded. As an illustrative example using the search path of FIG. 1A, the user or version loader may specify which of the versions of program P are to be loaded. More specifically, the user may specify the desire to load program P 1.2 (112). In that case, the alternate versions (versions 1.1 and 1.3) would be avoided, irrespective of the search path and order used. As long as the appropriate version information is provided, the version aware loader would be able to load any desired version of program P or Q. By way of example, the latest versions of P and Q may be specified and loaded regardless of the search path and location of different versions of P and Q.

Figure 2B:
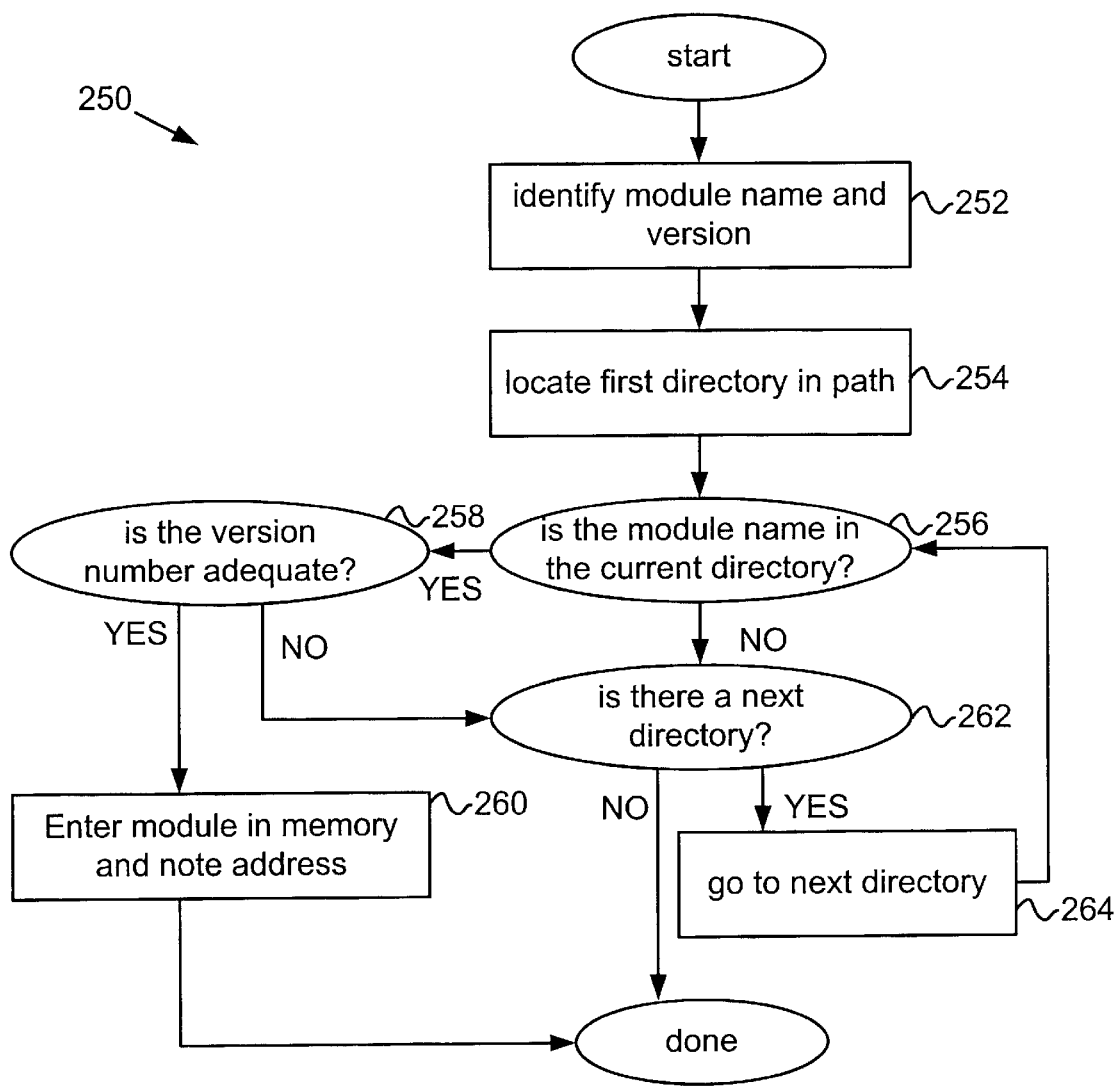
FIG. 2B illustrates a flowchart for loading the module of FIG. 2A according to name and version in accordance with one embodiment of the present invention.

FIG. 2B presents a flowchart 250 for loading module 200 based on its name and version in accordance with one embodiment of the present invention. A version-aware loader designed in accordance with this invention may perform such a process. The process flow 250 begins with identifying the module name 202 and version identifier 204 of the module 200 (252). Collectively, the module name 202 and version identifier 204 may be referred to as "dependency criteria." The dependency criteria may be passed to the version aware loader via command line invocation or an internal API call, for example. Once the name of the file to be found has been established, a search may be initiated. When the first directory is reached in the search path (254), the directory is checked to see whether it contains a module having the module name 202 (256). If a module having the module name 202 is in the current directory, the version number is checked (258). In one approach, the version number may be checked by viewing the header file. In another approach, the version number is checked by viewing version numbers that may be contained within, or are directly accessible from, the search path. If the version number is adequate, then the module is loaded into memory and its address is noted (260).

Alternatively, if a module having the module name 202 does not exist in the current directory or the version number is inappropriate, then the process 250 determines whether another directory exists (262). If it does (264), then the version loader continues to search for a correct module in the next directory of the search path (back to 256). Otherwise, the process flow 250 is complete and the user may be notified of the incompatibility.

Often, when the module 200 is loaded and executed, it may call additional modules. These must also be verified for version compatibility. By way of example, if the program P is to be loaded, and the program P calls program Q, the appropriate version of program Q must also be loaded. If not, execution will fail. To ensure proper execution, the version aware loader must be responsible for loading the proper versions of any program modules named Q. Further, any program modules called by Q during its execution must also be compatible with the loaded versions of Q and with any other modules that might call it. To this end, version loaders (and associated methods) of the present invention may constrain loading of programs called by another program being loaded. Typically, this means that the loader will constrain the called modules to certain compatible versions. However, this requires that the loader know which modules are called by a particular module and which versions of the called modules are compatible with the calling module. Thus, the version aware loader may be implemented in manner allowing unresolved references for a module to be recursively resolved.

For purposes of clarity, the following classifications will be used herein. An "explicit" load is one in which the loader is provided with the name and version of a program to be loaded. An "implicit" load is one in which the loader determines the name and version of a module to be loaded based on unresolved references within a module being loaded. To state this a different way, an explicit load may be defined as a type of program load request in which the name, and optionally the version number, of the program is provided to the loader as part of the request. Implicit loading may be defined as a type of program load request in which the name of the program to load is determined internally by the loader based on unresolved references in the program that is being loaded.

To handle explicit and implicit load requests, modules designed for use with this invention preferably include declarations of the called modules and of their compatible versions. For example, the module 200 includes a compatibility vector 206. The compatibility vector 206 contains the names and versions of the programs that the module 200 interacts with via call. Preferably, the compatibility vector 206 identifies every program and allowable version levels for each program to be resolved and implicitly loaded for the module 200. In one embodiment, the compatibility vector 206 includes an entry for each program that the module 200 interacts with. In the example shown, each entry includes a name of a module and its respective allowable version levels that the module 200 interacts with. Specifically, the compatibility vector 206 includes three entries 208, 210 and 212 for three different modules having distinct module names and allowable version levels for each module.

Figures 3A, 3B:
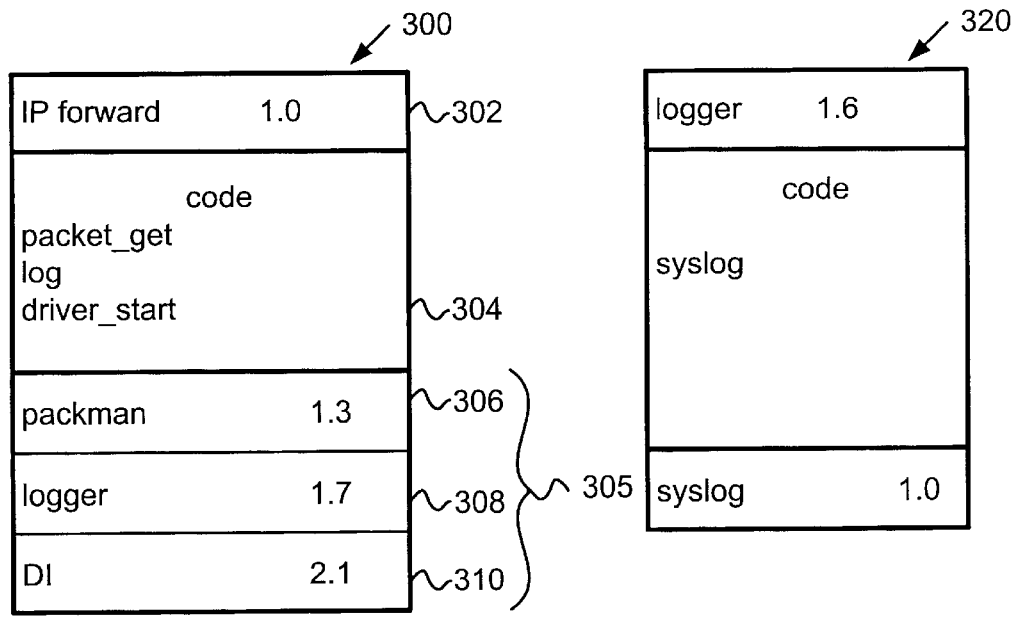
FIGS. 3A–C illustrates an exemplary explicit and implicit loading example for a component "IP forward".
Figures 3C, 5:
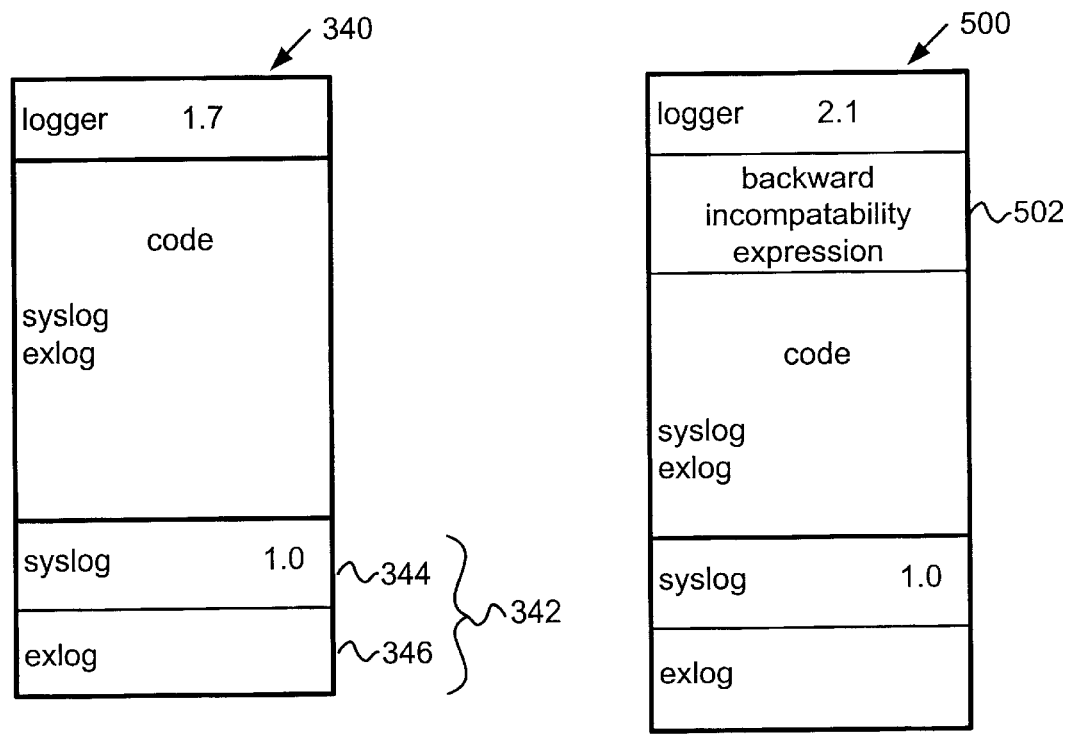
FIG. 5 illustrates a module including backward incompatibility expression.

FIGS. 3A–C illustrate a set of three modules used in an explicit and implicit loading example. In this example, the primary module is a component "IP forward 300" including a header 302. The header 302 contains a name "IP forward" and a version number "1.0". The component "IP forward 300" also includes code 304. The code may contain functions, which call one or more programs during execution. In this specific example, IP forward 300 calls function (packet_get) in a packet manager component named 'packman', a function (log) in a component named 'logger' and a function (driver_start) in a component named 'DI'. A compatibility vector 305 includes the names of these components and the respective acceptable versions thereof, which may be called by this version of component "IP forward 300". The compatibility vector 305 includes three entries 306, 308 and 310. The entry 306 identifies the component 'packman' and specifies the version number '1.3' as required for the component "IP forward 300". Similarly, the entry 308 identifies the component 'logger' and specifies the version number '1.7,' while the entry 310 identifies the component 'DI' and specifies the version number '2.1' as required for the component "IP forward 300". Thus, the version aware loader typically looks for the compatibility vector 305 in order to load the component "IP forward 300".

The component "IP forward 300" participates in both explicit and implicit loading. More specifically, the version aware loader will be supplied an explicit request for loading the component "IP forward 300". This is an example of explicit loading. Upon loading, the loader is responsible for making the component "IP forward 300" available for subsequent execution (e.g., taking executable code from disk and loading it into memory). In order to do this, the loader must provide pointers to memory locations for any internal calls from the "IP forward 300" component. In this example, the loader must perform this function for each of the modules comprising packman, logger and DI as specified by compatibility vector 305. If any of these called modules have not been previously loaded, they must now be loaded. This loading based upon a compatibility vector is called implicit loading.

Compatibility vectors allow recursive implicit program load requests. In other words, the modules identified by a first implicit load may, in turn, contain their own compatibility vectors which require implicit loading of the modules identified. This recursive implicit loading scheme can proceed for as many levels as required by the software architecture. For example, for the component "IP forward 300", the compatibility vector 305 includes three implicit load request entries 306, 308 and 310 for the programs packman, logger and DI. In addition, a compatibility vector may be present in any one of the modules packman, logger and DI, including the implicit load requests from each of these programs.

To resolve each implicit load request, the loader searches for each respective module. By way of example, for the entry 308, the loader searches through the file system for a suitable version of 'logger'. In an exemplary search based on the name 'logger', the loader may come across a module logger 320 having a version number 1.6 (FIG. 3B). In this case, the version number is not acceptable for the component "IP forward 300" and the search proceeds. Subsequently, the loader may come across a module logger 340 having a version number 1.7 (FIG. 3C). In this case, the version number is 1.7 and is acceptable for the version of logger required for the component "IP forward 300". However, the component logger 340 also includes a compatibility vector 342 to be resolved.

The compatibility vector 342 includes two implicit load request entries 344 and 346 for the components 'syslog' and 'exlog' respectively. If the entries 344 and 346 are unresolved for the component "IP forward 300", the loader would then proceed to resolve each in turn. In each case, the loaded program may carry its own dependency criteria via a compatibility vector. For example, the program syslog must be of a version of 1.0. In addition, during the resolution of the entries 344 and 346, any implicit loading requests in modules which are needed to resolved the entries 344 and 346 would also have to be implicitly resolved.

Figure 4:
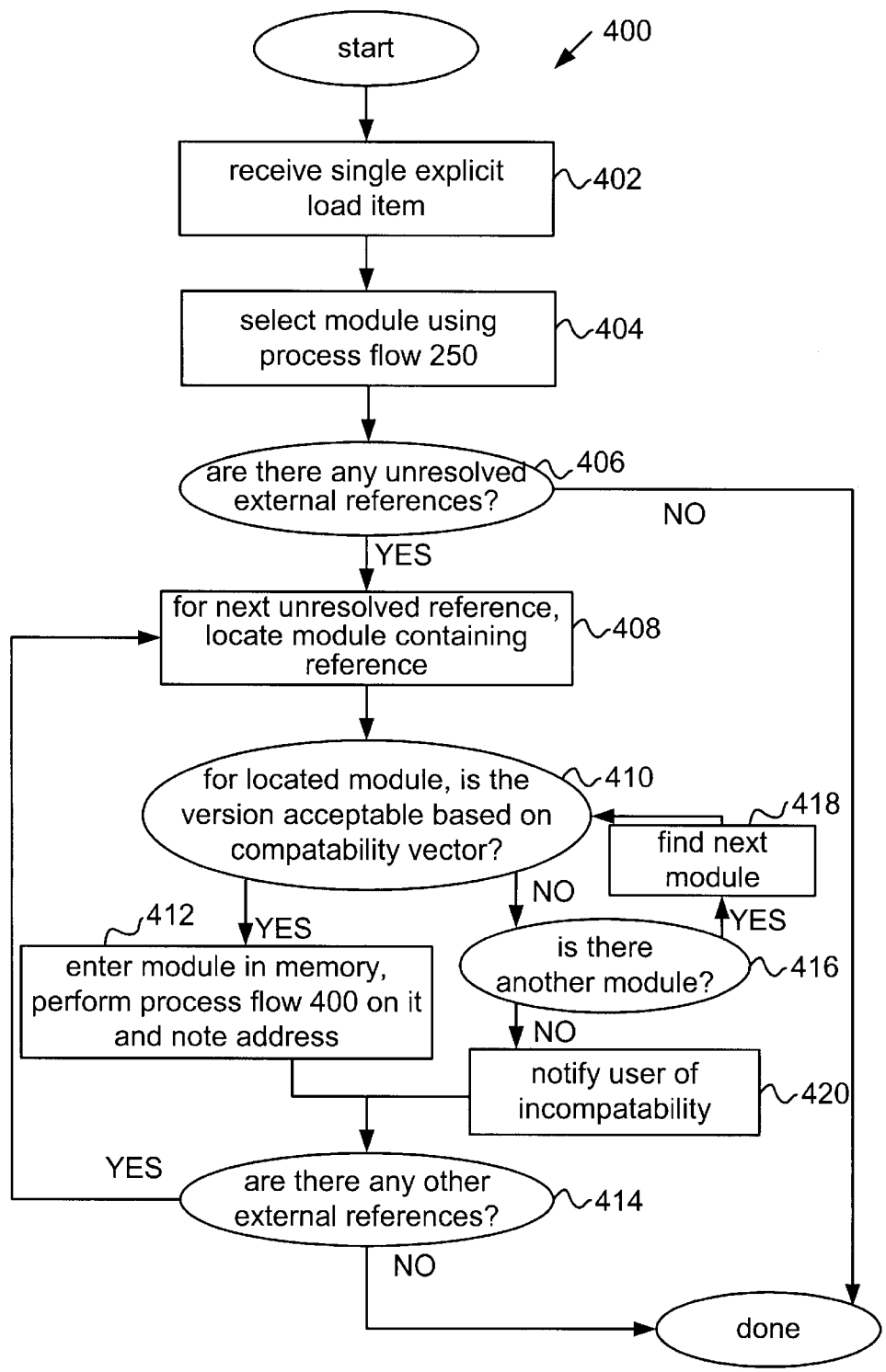
FIG. 4 illustrates a flowchart for loading the component "IP forward" of FIG. 3A including explicit and implicit load requests in accordance with one embodiment of the present invention.

FIG. 4 provides a flowchart 400 for loading the component "IP forward 300" including explicit and implicit load requests in accordance with one embodiment of the present invention. The process flow 400 begins with the loader receiving a single explicit load request for the component "IP forward 300" (402). The explicit load request typically includes version information for the load request. Previously, the loader may have collected a set of programs in a software environment and separated them into components. Typically, the loader represents each component interface in the form of public header file. In one embodiment, versioning is performed at the component level and the modules are a mechanism to implement the functionality of the components.

Once the dependency criteria have been established for the explicit load request, a search may be initiated corresponding to the explicit load request according to the process flow 250. When the component "IP forward 300" is found and its version information is satisfied (404), the component "IP forward 300" is checked for any external references (406). The external references can be found by checking within the module. Subsequently, the external references are resolved.

If the component under consideration contains unresolved external references, implicit load requests will be used to resolve them. Starting with the next implicit reference to be resolved, the program corresponding to the reference name is located using a suitable search path such as identified in process flow 250 (408). When the candidate module is located, the version number is tested for compatibility based on the compatibility vector (410). If the version number is acceptable, then the module is loaded into memory and its address is noted (412). The process flow then proceeds to check for more external and unresolved references (414). If more are found, the implicit loading for the process flow 400 resolves the next external reference (408, 410 and 412) and the process repeats.

When the version number is unacceptable, then the process flow 400 proceeds down the search path to determine whether another module exists having the same name (416). If another module is found (418), the process flow 400 determines its acceptability (410). Otherwise, if the search ends without finding another suitable module, the user may be notified of the incompatibility for the current module (420). If another implicit load request exists (414), then the process flow 400 resolves the next implicit load request (back to 408). The process repeats until all of the implicit requests have been searched.

Having briefly discussed some general aspects and methods of the present invention, some of the above mentioned features will now be expanded upon to illustrate some of the alternate aspects of the present invention.

In a particular embodiment to simplify loading, the present invention enhances implicit load requests by allowing the loader to locate and use information in the compatibility vector of a module obtained by an explicit request as an input argument when performing implicit module loads. In other words, the version aware loader may accept explicit information to aid implicit loading. By way of example, the implicit information may not specify a particular version number and the explicit version number may be used. Alternatively, a component may include multiple modules all requiring the same version number. In some cases, a component may include about 20 to 50 modules all having the same version requirements. Thus, the modules may be grouped according to version number within a component to simplify the loading and the explicit information may be used for the common group.

To increase user flexibility, the enhanced program loading techniques of the present invention also allow flexible definition of acceptable version information. In one embodiment, in order to increase loading flexibility, the version specification for a desired module is not limited to a single value or a specific version. More specifically, a selection mechanism may be implemented. The selection mechanism may be expressed as an arbitrary Boolean equation or any other logical expression, relation or mathematical representation. By way of example, a Boolean expression is implemented in the compatibility vector 305. For the component "IP forward 300", the entry 308 for the logger module may specify a version greater than or equal to 1.7. Thus, upon searching, the logger module 340 (FIG. 3C) and a logger module 500 (FIG. 5) will satisfy the Boolean expression while the logger module 320 (FIG. 3B) is still restricted.

In this manner, software designers may designate compatibility to their program in an open manner to maintain the broadest possible compatibility. Such declarations are common in the software industry when version numbers are progressively increased over time, i.e., "requires Microsoft Windows 3.1 or higher". In the version aware environment of the present invention, this information is implemented using a suitable algebraic expression in an entry of the compatibility vector, i.e., module name "Windows" with a version greater than or equal to 3.1. Thus, using a mathematical expression in an open manner such as this may allow a programmer to designate acceptable compatibility according to a minimum version number or a version number corresponding to a minimum date of release.

The Boolean expression may use the typical comparative operators used in computer programming languages as well as any other mathematical relationships. Preferred operators suitable for use in the present invention include less than or equal, less than, equal, not equal, or, and, greater than or equal, and greater than. These operators may appear in any combination, in any order, and may appear any number of times. In other words, the operators may be combined in any manner to create a logical equation of arbitrary complexity and focus. For example, in some cases, software programs are not numbered progressively or systematically over time. In this case, the logical expression may be a logical matching including one or more Boolean expressions. The Boolean expression is evaluated and the result is either "true" or "false". If the result is "true", the module satisfies the version portion of the dependency criteria. If the result is "false", the module does not satisfy the dependency criteria and the search may proceed for a suitable module.

The ability to define desirable versions of a module according to customized mathematical expression may be included in the dependency criteria and used in evaluation of a candidate module. Accordingly, multiple versions of a module may exist in a search path while only a subset may be selectively loaded based on the selection mechanism. It should be noted that other parts of the dependency criteria may be flexibly designated. By way of example, it is common for a program to vary in name over alternate versions. In this case, the dependency criteria may be designated such that a search may be based on an inclusive name search. The name search may be relative to known names of a program or some other less focused mechanism. Advantageously, the version aware loader of the present invention is dynamic and has access to all version and dependency information and may use it to load a correct version of a given program despite the order of the search path.

The ability to flexibly define module selection criteria enhances the loader's version selection mechanism. The resulting flexibility simplifies the task of managing multiple versions of one or more programs on a platform or operating system. Correspondingly, this simplified management permits increased inter-program sophistication within a system. In addition, this simplified management permits improved continuous updating and management of programs and systems in a multiple program arena.

In some cases, when an unbounded Boolean expression (i.e. "requires version 3.1 or greater") is used, a problem may arise when a program is no longer backwards compatible with its previous versions. Consider for example the previous discussion of component "IP forward 300" in which a Boolean expression was used to define an acceptable logger module. In that example, the dependency criteria in the compatibility vector 305 openly allow any logger versions greater than or equal to version 1.7. However, the logger module 500 of version 2.1 may not be compatible with component "IP forward 300". This difficulty is commonplace when programs are developed independently by separate and uncoordinated development organizations. Eventually one or more new logger versions will be backward incompatible with the calling component ("IP forward 300" in this example). In such case, the Boolean declaration of earlier released versions of "IP forward 300" would no longer be accurate and their interactions may be incorrect. It is impossible for the designers of "IP forward 300" to know if and when an incompatibility will arise.

To overcome this backward incompatibility, the present invention permits (or may require) new versions of a program to restrict use by other applications. In one embodiment, a mechanism is provided which allows a module to declare incompatibilities with older programs that it may interact with in order to provide a restriction on backward incompatibility. The mechanism includes a backward incompatibility expression stored in the new module.

For example, the logger module 500 includes a backward incompatibility expression 502. The backward incompatibility expression 502 is a Boolean or other mathematical representation, which limits the applications that may call the logger module 500. In one embodiment, the backward incompatibility expression 502 defines the compatibility for the program in which it is located. For example, in the case in which version numbers increase in number over time, the backward incompatibility expression 502 defines the minimum version number of logger that that "IP forward 300" must request. Alternatively, the backward incompatibility expression 502 may further constrain an existing Boolean expression in order to enforce compatibility between two modules.

Thus, the backward incompatibility expression 502 may be included as an additional criterion in finding a suitable module during a search. In operation, the version aware loader of the present invention is designed or configured to check for and respond to the backward incompatibility expression 502 when it searches program files to resolve references for a compatibility vector 305. Thus, as a search progresses through the search path, a module may be selected when the version satisfies both the dependency criteria and the backward incompatibility expression 502. For the component "IP forward 300" of FIG. 3A, if the logger module 500 is encountered first in the search path, it will be rejected based upon its backward incompatibility expression 502. The search may then proceed to find the appropriate logger module 340.

Typically, the programmer responsible for introducing the backward incompatible program or module would be responsible for the backward incompatibility declaration. By permitting a potential program to restrict itself to satisfying only requests made in a certain manner, developers may be allowed to change an API in a manner that makes it unsuitable to previous users and, at the same time, protect the validity of unbounded Boolean expressions in legacy programs. In other cases, developers may automatically restrict users from accessing a new version of a program. This improves the ability for programmers to develop applications in an open forum where components are developed independently and released as desired by a developer's needs. In addition, this improves the ability of the version aware loader to select a suitable version of a program to avoid version incompatibility problems as new versions are released.

In one specific embodiment, the requirements of providing appropriate headers, compatibility vectors, and backward incompatibility expressions are imposed on all developers within a business organization or a more loose knit group developing for a common platform. Presumably, version aware loaders operating in accordance with this invention would load all software developed in such environment. In one case, the module design requirements of this invention may be applied to designers of modules in a large operating system such as an operating system employed to control operation of network devices such as routers.

Generally, the version aware loading techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid version aware loading system of this invention is preferably implemented on a programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the version aware loading systems of this invention may be specially configured routers such as specially configured router models 1600, 2500, 2600, 5000, 4500, 4700, 7200, 7500, and 12000 available from Cisco Systems, Inc. of San Jose, Calif. A general architecture for some of these machines will appear from the description given below. In an alternative embodiment, the version aware loading system may be implemented on a general-purpose network host machine such as a personal computer or workstation. Further, the invention may be at least partially implemented on a card (e.g., an interface card) for a network device or a general-purpose computing device.

Figure 6:
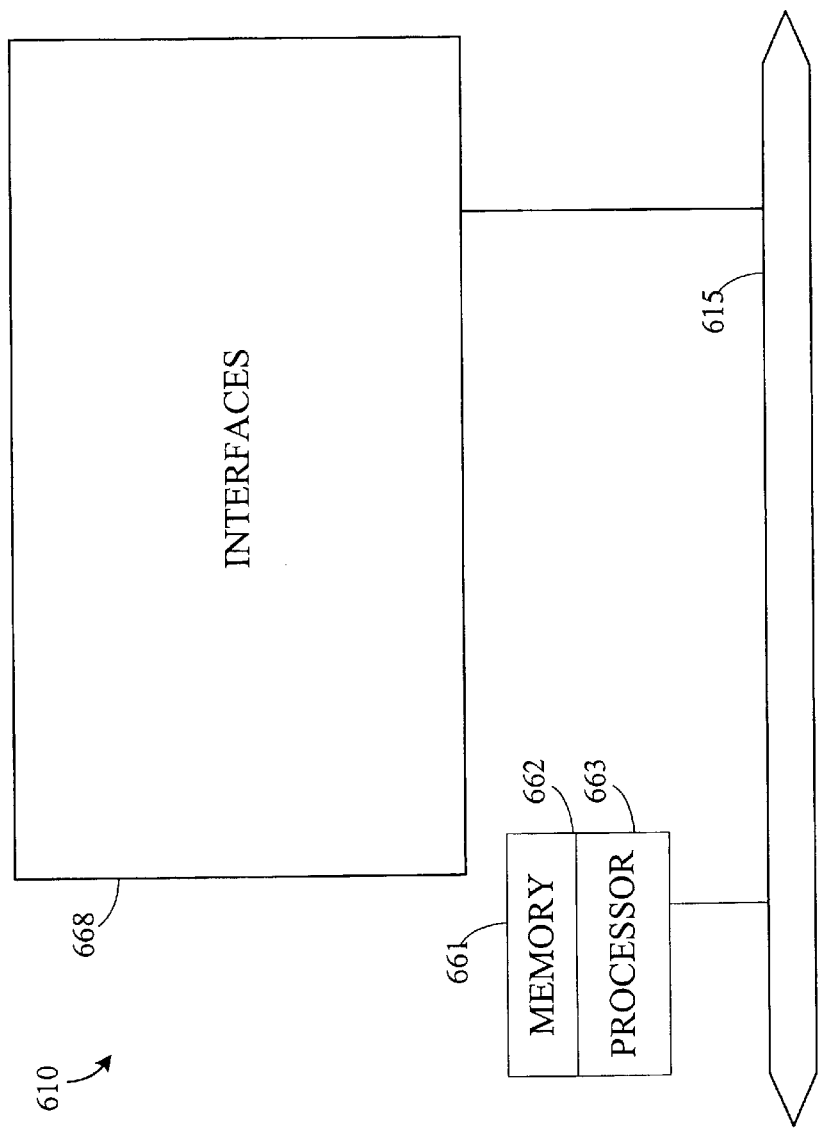
FIG. 6 illustrates a router suitable for implementing the present invention.

Referring now to FIG. 6, a router 610 suitable for implementing the present invention includes a master central processing unit (CPU) 662, interfaces 668, and a bus 615 (e.g., a PCI bus). When acting under the control of appropriate software or firmware, the CPU 662 is responsible for such router tasks as routing table computations and network management. It may also be responsible for accessing header files, forming eligibility lists and looking for module search paths, verifying dependency etc. It preferably accomplishes all these functions under the control of software including an operating system (e.g., the Internetwork Operating System (IOS®) of Cisco Systems, Inc.) and any appropriate applications software. CPU 662 may include one or more processors 663 such as a processor from the Motorola family of microprocessors or the MIPS family of microprocessors. In an alternative embodiment, processor 663 is specially designed hardware for controlling the operations of router 610. In a specific embodiment, a memory 661 (such as non-volatile RAM and/or ROM) also forms part of CPU 662. However, there are many different ways in which memory could be coupled to the system. Memory block 661 may be used for a variety of purposes such as, for example, caching and/or storing data, programming instructions, etc.

The interfaces 668 are typically provided as interface cards (sometimes referred to as "line cards"). Generally, they control the sending and receiving of data packets over the network and sometimes support other peripherals used with the router 610. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 662 to efficiently perform routing computations, network diagnostics, security functions, etc.

Although the system shown in FIG. 6 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 665) configured to store data, program instructions for the general-purpose network operations and/or determine version acceptability during loading as described herein. The program instructions may control the operation of an operating system and/or one or more applications, for example. The memory or memories may also be configured to store compatibility vectors, dependency criteria, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM), or any device or devices that may be developed to replace any of the aforementioned. The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

The methods for generating the compatibility vector 305 and general version aware principles outlined above may vary widely. Note that the version information is generally located in a spot (e.g., a specific directory) directly known to the loader. In one embodiment, an automated system of generating modules suitable for loading in accordance with this invention works as follows. First, the header file 201 for each of the modules is created. The compiler then creates the compatibility vector 206 for a program being loaded. In one embodiment, a language specific macro is used to generate data that is placed in two named sections of the program file corresponding to the header 201, the backwards incompatibility expression and the compatibility vector 206.

In one embodiment, the version information is built in at a low level such that access may be attained easily. More specifically, access to the version specific systems and methods of the present invention do not require the use of high level tools such as an install manager or some other special install tool, which may not be included in a system or which, if included, can be circumvented either intentionally or unintentionally. Obviously, the operating system and program language that the version aware methods and apparatus are implemented upon will influence application details and provide for minor alterations. In one embodiment, the loader is concerned with an API. The API is a set of function calls for providing a related set of functions, e.g. for a component. Correspondingly, the compatibility vectors may be based on the API names and not the component names.

In another embodiment, the present invention is implemented within an IOS/ENA (enhanced network architecture) environment. In its predecessor, IOS, programs were built from a common source repository and linked together statically. Typically, the foregoing discussion of version compatibility problems would not be as prevalent since the programs would often be merged at some point in time. However, in an IOS/ENA environment, many components, such as the RIP version V2, are being developed separately. In this case, the object code is implemented in extended link format (ELF). Within ELF, sections are stored for the particular actions of the loader to load the appropriate version of a program. By way of example, the sections may include read only data, SBSS, text, compatibility vector, etc. In this case, the ENA may also use its own install manager.

In yet another embodiment, the present invention is implemented using 'C' commands and a logical control buffer. The present invention is also suitable for application on a computer with a wide number of operating systems including, but not limited to IBM operating systems such as OS/SVS, OS/MVS and OS/390, IBM's Conversational Monitor System, Generic Unix and Microsoft Windows 3.1 and NT.

In one embodiment, the process flow 400 is implemented at load time. Load time can be considered the period of time between install time and run time. Verifying version compatibility in load time operates to check a program for compatibility with other programs after the program has been installed on disk. This catches and/or avoids incompatibilities at run time (i.e., during execution of executable code). If inherent incompatibilities were identified only at run time, the computer user would potentially waste significant time and computer resources attempting to use cooperatively or combine programs that were never meant to be used in this way. Advantageously, this method prevents that.

The present invention is not limited to any particular searching path or methodology. Indeed, an advantage of the present invention is that it allows any search path to be used while still selecting an appropriate version for a program. By way of example, the present invention is suitable for searching based on either a single or on multiple paths.

The present invention also encompasses a wide variety of loading mechanisms. In one embodiment, the version aware loader is a portion of code that uses the search path and decides whether or not to load a particular module or program. In another embodiment, a static linkage editor may be used. The linkage editor takes a separate collection of object files and puts them together into one operable unit.

The present invention provides a wide variety of benefits and applications. Advantageously, the present invention simplifies the task of software support for software support personnel by generally reducing and in some cases eliminating the need to know the details of search path configuration or how to load multiple versions of the same program. In addition, support personnel may more easily install new features and program updates, apply maintenance, and support continuous operation. The systems and methods of the present invention are also suitable for operating systems having more than one version of a named program. Advantageously, the loading techniques using version awareness and the compatibility vector 305 enhance the system's ability to support simultaneous execution of multiple versions of the same program.

In addition, the present invention advances software management and development by providing an implicit method of passing and using version compatibility information. This allows software developers to develop isolated components in an independent environment. Advantageously, the present invention simplifies the task of software design for users and programmers by eliminating the necessity to know many significant details of system configuration as well as the details of managing multiple versions of related programs. Module developers simply need to know which other modules or components will be called by the module being written and which other components.

Although the foregoing invention has been described in some detail for purposes of clarity of understanding, it will be apparent that certain changes and modifications may be practiced within the scope of the appended claims. By way of example, although the present invention has described the selection mechanisms in terms of Boolean or other mathematical relationships, the selection mechanisms for version compatibility may also include matrices as well as other reasonable extensions and extrapolations. Therefore, the present examples are to be considered as illustrative and not restrictive, and the invention is not to be limited to the details given herein, but may be modified within the scope of the appended claims.

What is claimed is:

1. A method of loading a software program into memory, the software program including multiple modules, at least one of which is available in a plurality of versions identified by a set of version numbers, the method comprising:

identifying a module to be loaded as part of the software program, wherein the module is identified, at least in part, by an acceptable version number defined by a software designer;

selecting the module based upon an acceptable version number from among the set of versions numbers of the module; and loading the selected module into memory.

2. The method of claim 1 wherein the plurality of versions of the module share a common name.

3. The method of claim 2 wherein each module sharing the common name has a unique version number within the set of version numbers.

4. The method of claim 2 further including searching for the module in a search path using the common name.

5. The method of claim 2 wherein selecting the module comprises selecting the first module found that has the common name and the acceptable version number belonging to the acceptable version number set.

6. The method of claim 2 wherein the acceptable version number set is identified by a Boolean expression.

7. The method of claim 6 wherein the Boolean expression specifies a group of version numbers that are greater than or equal to a particular version number of the module.

8. The method of claim 7 wherein the particular version number for the module corresponds to a minimum date of release for the module.

9. The method of claim 2, wherein selecting the module based upon an acceptable version number comprises:
    finding a potential module in the search path having the common name; and
    confirming that the potential module has the acceptable version number.

10. The method of claim 1, further comprising, prior to loading, confirming that the selected module is compatible with any modules that call it.

11. The method of claim 1 wherein loading the module comprises specifying a memory address to be used to access the module for the module during execution.

12. The method of claim 1 wherein the module is included in a component and the component has a set of functionally related modules.

13. The method of claim 1 wherein the selected module includes a compatibility vector identifying one or more components to be called by it during execution.

14. The method of claim 13 wherein the compatibility vector further comprises, for each module to be called by the selected module, a compatible version set.

15. The method of claim 1 further including executing the selected module after it has been loaded into memory.

16. The method of claim 1 further including informing a user if no module was found that corresponded to an acceptable version number.

17. A machine-readable medium on which is provided a versioned software module capable of being loaded with various combinations of other modules and subsequently being executed, the software module comprising:
    a name in common with at least one module not included in the software program, the module and the at least one module not included in the software program differing by a first version identification included in the module and a second version identification included in the at least one module not included in the software program; and
    a compatibility vector embedded in a section of the module separate from a code section, the compatibility vector including a set of entries, wherein each entry in the set of entries includes (i) the name of a component containing a called module that is called by the versioned software module during execution, and (ii) a compatible version number or group of version numbers for the component containing the called module.

18. The machine-readable medium of claim 17, wherein the compatible version number or the group of version numbers is expressed as a logical range of version numbers.

19. The machine-readable medium of claim 18, wherein the logical range is provided in the form of a Boolean expression.

20. The machine-readable medium of claim 17, further comprising indicia of backward incompatibility with other modules that may call the versioned software module.

21. The machine-readable medium of claim 17, wherein the name and first version identification are provided in a header of the versioned software module.

22. The machine-readable medium as recited in claim 17, further comprising loaded executable software comprising at least two separate versioned software modules.

23. A computer system capable of loading and executing software, the computer system comprising:
    a memory which temporarily stores software modules for execution;
    a processor which executes loaded software modules; and
    a loader which loads said software modules into the memory, wherein the loader selects at least some software modules for loading based on acceptable version numbers, when such modules are available in a plurality of versions identified by a set of version numbers according to a compatibility vector embedded in a section of the module separate from a code section.

24. The computer system of claim 23, further comprising a second memory which stores the software modules, wherein the loader loads the software modules into memory from the second memory prior to execution.

25. The computer system of claim 23, wherein at least some of the software modules selected based on acceptable version numbers share common names with other software modules having different version numbers.

26. The computer system of claim 25, wherein the loader uses the common names to search for the software modules in a search path.

27. The computer system of claim 23, wherein the loader employs Boolean expressions specifying ranges of acceptable version numbers for selecting the software modules to be loaded.

28. The computer system of claim 23, wherein the loader determines whether a software module to be loaded is incompatible with another software module that will call it.

29. The computer system of claim 23, wherein the loader considers a compatibility vector of a software module, wherein the compatibility vector identifies one or more modules to be called by the software module.

30. A computer program product comprising a computer readable medium on which is stored a program instructions for loading a software program into memory, the software program including multiple modules, at least one of which is available in a plurality of versions identified by a set of version numbers, the program instructions comprising:
    identifying a module to be loaded as part of the software program, wherein the module is identified, at least in part, by an acceptable version number;
    selecting the module based upon an acceptable version number defined by a software designer from among the set of versions numbers of the module; and
    loading the selected module into memory.

31. The computer program product of claim 30 wherein the plurality of versions of the module share a common name.

32. The computer program product of claim 31 further including instructions for searching for the module in a search path using the common name.

33. The computer program product of claim 31 wherein the acceptable version number set is identified by a Boolean expression.

34. The computer program product of claim 30, further comprising instructions for confirming, prior to loading, that the selected module is compatible with any modules that call it.

35. The computer program product of claim 30, wherein the selected module includes a compatibility vector identifying one or more modules to be called by it during execution.

36. The computer program product of claim 35, wherein the compatibility vector further comprises, for each module to be called by the selected module, a compatible version set.

37. The computer program product of claim 30, further including instructions for informing a user if no module was found that corresponded to an acceptable version number.

38. A method managing a software environment, the software environment including a plurality of software applications, the plurality of software applications including a module having a common name, the method comprising:

loading a first numbered version of the module having a common name for a first application, the first numbered version defined by a software designer;

loading a second numbered version of the module having a common name for a second application, the second numbered versiond defined by a software designer;

running the first numbered version of the module having a common name; and running the second numbered version of the module having a common name.

39. An apparatus for loading a software program into memory, the software program including multiple modules, at least one of which is available in a plurality of versions identified by a set of version numbers, the apparatus comprising:

means for identifying a module to be loaded as part of the software program, wherein the module is identified, at least in part, by an acceptable version number;

means for selecting the module based upon an acceptable version number defined by a software designer from among the set of versions numbers of the module; and means for loading the selected module into memory.

40. A machine readable medium on which is provided a software module available for loading to memory and subsequently executing; the software module comprising:

a definition section specifying a module name and a version number;

a code section containing program instructions; and a compatibility vector embedded in a section of the module separate from a code section, the compatibility vector identifying one or more called modules to be called by the software module during execution, and for each such called module identifying one or more versions of the called module that are compatible with the software module.

* * * * *